J. W. HUGHES.
Filter.
No. 209,617.        Patented Nov. 5, 1878.
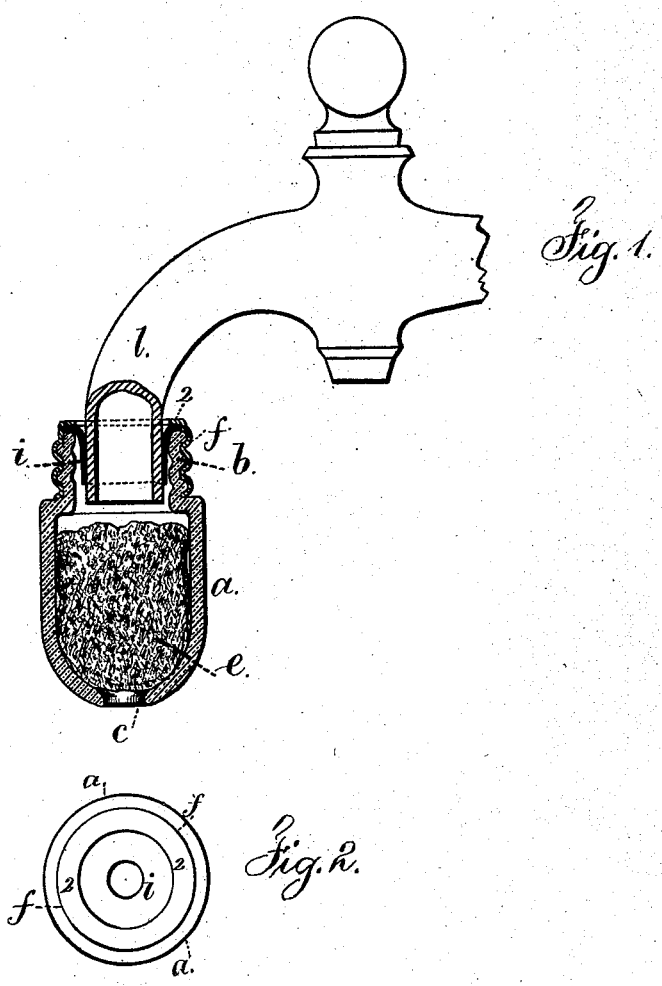

UNITED STATES PATENT OFFICE.

JOHN W. HUGHES, OF BROOKLYN, ASSIGNOR TO MARY A. MYERS, OF WEST CHESTER, NEW YORK.

IMPROVEMENT IN FILTERS.

Specification forming part of Letters Patent No. 209,617, dated November 5, 1878; application filed August 17, 1878.

*To all whom it may concern:*

Be it known that I, JOHN W. HUGHES, of Brooklyn, in the county of Kings and State of New York, have invented an Improvement in Filters, of which the following is a specification:

Filters have been made of sponge within a case, and in some instances glass has been used for such case.

My invention is made for the purpose of simplifying the construction of the filter, and for connecting it to a faucet without the use of a screw, so that it is especially adapted to water-coolers, for the purpose of retaining any sediment or foreign matter, such as results from the use of ice in the cooler.

In the drawings, Figure 1 is a vertical section of the filter, as applied to the end of a faucet, and Fig. 2 is a plan of the elastic diaphragm and filter.

The glass vessel $a$ is made with a screw-neck, $b$, at one end, and a discharge-hole, $c$, at the opposite end, and within this the sponge $e$ is inserted and packed with sufficient compactness to filter the water that is allowed to run through the same.

Upon the screw-neck $b$ a sheet-metal ferrule, $f$, is screwed. This ferrule is provided with an inward flange, 2, of a width sufficient to clamp to the end of the neck the elastic diaphragm $i$, which is made with a comparatively small central hole. The rubber diaphragm, being held firmly at its edges, can be pressed upwardly over the nose or bib $l$ of the faucet, and the contraction of the rubber will produce sufficient friction to prevent the filter being pressed off by the rush of water from the faucet, and at the same time leakage is prevented.

According to the quality and thickness of the rubber diaphragm, so the power required to press the filter upon the faucet or to draw it off will be more or less.

I claim as my invention—

The glass vessel $a$, having a screw-neck, $b$, at one end, and a discharge-hole, $c$, at the other end, and receiving the filtering material, in combination with the elastic diaphragm $i$ and metallic ferrule $f$, that screws upon the neck $b$ and clamps the diaphragm directly to the same, substantially as set forth.

Signed by me this 12th day of August, A. D. 1878.

JOHN W. HUGHES.

Witnesses:
 GEO. T. PINCKNEY,
 CHAS. H. SMITH.